United States Patent Office 3,562,351
Patented Feb. 9, 1971

3,562,351
DIMERIZATION PROCESS
Joseph K. Mertzweiller and Horace M. Tenney, Baton Rouge, La., assignors to Esso Research and Engineering Company, a corporation of Delaware
No Drawing. Filed Nov. 16, 1967, Ser. No. 683,493
Int. Cl. C07c 3/10
U.S. Cl. 260—683.15                              3 Claims

ABSTRACT OF THE DISCLOSURE

A Group VIII water-soluble metal salt impregnated upon a suitable support such as aluminum oxide, silica, activated carbon or the like, is heat-treated in an inert atmosphere at a temperature sufficient to remove water and absorbed oxygen from the supported metal salt, but insufficient to oxidize the metal salt to its oxides. This catalyst is then activated by treating it with an organometallic compound $R_nM$, wherein M is a metal selected from the group consisting of lithium, magnesium, calcium, strontium, zinc, cadmium, boron, and aluminum, and R is a monovalent organo or hydrocarbon radical containing from 1–20 carbon atoms, and $n$ is an integer ranging from 1–3 equal to the valence of M.

Catalysts activated in this manner have been found to have surprisingly increased activity for dimerizing and codimerizing monoolefins and, particularly, in the codimerization of propylene with normal butene wherein the selectivity to $C_7$'s in the reaction mixture is remarkably enhanced.

---

It is known to polymerize various unsaturated organic or hydrocarbon compounds, especially similar and dissimilar olefins, in both thermal and catalytic reaction systems. The products of such systems have ranged from molecular weight polymers.

A process describing the production of low molecular weight products is illustrated, e.g., by reference to U.S. 2,993,942. In accordance therewith, catalytic mixtures of transition metal halides and aluminum alkyl compounds are used to produce products ranging in molecular weight from about 80 to about 2000. In U.S. 3,255,273, there is also disclosed a process utilizing supported partially dehydrated phosphoric acid catalysts for the production of heptenes by dimerization of $C_3$ and $C_4$ olefins in vapor phase. Though the process is catalytic in nature, the distribution of products is thermodynamically controlled and the charged $C_3$ and $C_4$ olefins form homopolymers as well as copolymers. In the process, it is difficult to restrict the chain length of the molecule, and there results a wide distribution of reaction products ranging from $C_6$ to $C_{12}$, and considerably higher. Moreover, the polymers formed in the reaction tend to be highly branched.

In application Ser. No. 661,225, filed Aug. 17, 1967 and now abandoned, lightly branched—viz., straight chain and singly branched—heptenes are selectively produced from $C_3$ and $C_4$ olefins, in kinetically controlled liquid phase reactions which utilize supported nickel oxide catalysts. In accordance therewith, lightly branched $C_6$, $C_7$ and $C_8$ olefins are obtained in yields ranging to about 45 percent and higher.

The primary objective of the present invention is to provide a new and improved process for highly selective dimerization or codimerization of unsaturated organic or hydrocarbon compounds, particularly those having active ethylenic unsaturation within the molecule. Specifically, it is an object to provide such process for selective dimerization or codimerization of similar and dissimilar olefins, particularly $C_2$ through $C_{12}$ olefins, and more particularly $C_3$ through $C_6$ olefins. More specifically, it is an object to provide a process utilizing low temperature liquid phase reaction systems to produce dimerization and codimerization products from such olefins at high conversions and yields. A further object is to provide such reaction systems for the dimerization and codimerization of aliphatic olefins, particularly monoolefins. Even more specifically, it is an object to provide such process for the dimerization and codimerization of linear alpha mono-olefins and linear internal monoolefins and linear internal mono-olefins, especially compounds of this character which contain from 2 to about 12 carbon atoms in the total molecule, and more especially those containing from about 3 to about 6 carbon atoms in the total molecule. A yet more specific object is to provide such process for the highly selective codimerization of propylene with butenes, especially n-butenes. Yet another object is to provide such process wherein diolefins can be selectively removed from other olefins, particularly mono-olefins, by hydrogenation, prior to or concurrently with the dimerization reaction.

These and other objects are achieved in accordance with the present process which contemplates contacting together, reacting or polymerizing similar or dissimilar unsaturated organic or hydrocarbon compounds in liquid or vapor phase in the presence of catalysts, comprising supported nickel and cobalt-complexes, at conditions suitable to favor the formation of addition of products, i.e., dimers or codimers, within the reaction product mixture. Preferably, the process is conducted by selective dimerization or codimerization of $C_2$ through $C_{12}$ olefins, and more preferably $C_3$ through $C_6$ olefins. In an especially preferred embodiment, mono-olefins, especially those containing up to about 12 carbon atoms, and more especially up to about 6 carbon atoms in the total molecule, are dimerized or codimerized. In an even more preferred embodiment, propylene and butylenes, especially n-butylenes, are reacted to form heptene-rich reaction product mixtures, predominantly lightly branched $C_6$, $C_7$ and $C_8$ olefins.

Suitably, the reactions are conducted at atmospheric or supra atmospheric pressures and at temperatures ranging from about 0° F. to about 500° F., and preferably from about 50° F. to about 250° F. Sufficient pressure is provided to maintain the reaction systems in liquid phase, at the selected temperature of reaction if liquid phase reaction is desired. Preferably, the pressure employed ranges from about 1 to about 100 atmospheres, and more preferably from about 1 atmosphere to about 50 atmospheres. It is also preferable to conduct the reactions in the presence of an inert diluent, and where this is done the pressures will be, to some extent, lower.

In codimerization reactions, the molar ratio of olefins in the feed is an important operating variable and greatly influences the selectivity of the reaction system. The molar ratio of the reactants is adjusted to give maximum selectivity, this generally ranging from about 1:1 to about 5:1 and greater, the least volatile component being used in the greater concentration at the conditions of operation. In the formation of heptenes from propylene and n-butylenes, e.g., lightly branched $C_6$, $C_7$ and $C_8$ olefins are formed, under normal operating conditions, by utilizing molar ratio of $C_4:C_3$ olefins ranging from about 1:1 to about 5:1 and greater, and preferably from about 2:1 to about 3.5:1. The optimum molar ratios cannot be precisely defined for any given system inasmuch as it is influenced, to some extent, by other operating conditions and by the nature of the reactants.

The preferred compounds are those unsaturated hydrocarbons possessing ethylenic unsaturation, and substituents as characterized by the following formula:

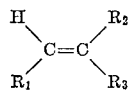

wherein, $R_1$, $R_2$ and $R_3$ are the same or different, substituted or unsubstituted monovalent substituents, or radicals, selected from the group consisting of hydrogen, alkyl, aryl, aralkyl, alkaryl, cycloalkyl, alkenyl, alkynyl, or the like. The total molecule contains from 2 to about 12 carbon atoms, and preferably from about 3 to about 6 carbon atoms. Exemplary of such substituents are methyl, n-propyl, isobutyl, octyl, decyl, dodecyl, phenyl, naphthyl, tolyl, xylyl, p-cumenyl, benzyl, diphenylmethyl, allyl, stylryl, ethynyl, methoxy, butoxy, phenoxy, and the like. Exemplary of compounds embraced by this formula are thus ethylene, hexene-1, octene, 2-methyl pentene-1, 4-ethyl pentene-2, 2-phenyl pentene-1, styrene, isoprene, 3-methyl pentene-1, and the like.

A feature of the invention is that diolefins, contained as impurities in process streams, can be selectively hydrogenated and removed from other olefins, if desired, prior to or concurrently with the desired dimerization or co-dimerization reactions. It has thus been found that from about 1 to about 5 moles of hydrogen, and preferably from about 2 to about 3 moles of hydrogen, per mole of diolefin contained in the feed, is sufficient to hydrogenate the diolefins under most conditions even while selected addition products are being formed from other olefins, e.g., monoolefins. In a preferred embodiment, e.g., 1,3-butadiene can be selectively hydrogenated and removed from a mixed feed containing n-butylenes and isobutylenes.

The catalysts used in accordance with this invention are formed by the steps of impregnating suitable support materials with salt solutions of certain Group VIII metals of the Periodic Chart of the Elements; heat-treating the impregnated supports to form chemical complexes at the surface of the support and to drive off moisture and adsorbed oxygen; activating and further modifying the surface complex by contact of the impregnated supports with liquid soluble organometallic compounds wherein a metal constituent is selected from Groups I, II and III of the Periodic Chart of the Elements; and treating to remove the unreacted or excess organometallic compound. A highly tenaceous chemical bonding can be formed between the surface of certain types of supports and Group VIII metals when the latter are applied to the supports as solutions of the desired metal, and heat treated. Of these metals, nickel, cobalt and mixtures of nickel or cobalt, or both, with iron or other metals are particularly important in forming catalytic species suitable in this invention. The supported species, or product formed by the heat treatment, is further chemically altered and activated by treatment with liquid soluble organometallic compounds, wherein the metal constituent of the compound is selected from Groups I, II and III of the Periodic Chart of the Elements.

Water has been found particularly suitable for application of the metal salt, or salts, to the support. In the sequence of process steps, a support is first impregnated with a water-soluble species of the metal salt, preferably nickel or cobalt, or mixtures of either or both of these metals with iron, by contact or immersion of the support in an aqueous solution of a salt, or salts, of the desired metal. Suitably, the support is impregnated with from about 1 to about 20 percent metal, and preferably from about 2 to about 10 percent metal, based on the total weight of the deposited metal and support.

The use of water to effect the chemical bonding is particularly important in the impregnation of the supports with the water-soluble salts of the desired metal. Nickel and cobalt are highly active, but even iron, which has extremely low activity when used alone, has produced an exceptionally active catalyst when applied to the support in admixture with nickel and iron salts dissolved in aqueous solution. Exemplary of the salts useful for application of the desired metals are halides, e.g., nickel chloride, nickel bromide, nickel fluoride, cobaltous chloride, sulfates, e.g., nickel sulfate, cobaltous sulfate, nitrates, e.g., cobaltous nitrate, nickel nitrate, water-soluble carboxylic acid salts, e.g., nickel acetate, cobaltous actate, and the like. Exemplary of iron salts suitable for admixture with the nickel and cobalt salts are halides, e.g., ferric chloride, ferrous chloride, sulfates, e.g., ferric sulfate, ferrous ammonium sulfate, nitrates, e.g., ferric nitrate, ferric acetates, formates, propionates, and water-soluble phosphates of nickel, cobalt and iron can also be employed.

The support, in powder or granular form, is then treated by establishing time-temperature relationships suitable to produce a chemical change on the surface of the support and to remove water and adsorbed oxygen. Suitably, the impregnated support can be heated in air, in inert atmosphere or in vacuum, e.g., 20 to 29 inches of mercury, at from about 300° F. to about 1200° F., or preferably from about 400° F. to about 800° F., for periods ranging from about 0.5 to about 4 hours, or preferably from about 1 to about 2 hours. On the other hand, the reaction between the salt and support can be accomplished by the elevated temperatures while moisture is stripped from the support with nitrogen, or other nonreactive gas. If desirable, the impregnation and heat-treating steps can be conducted in multiple stages. For example, the support can be impregnated and thence dried, or partially dried, at low temperature. The support can thence be reimpregnated and again dried, or partially dried. The heat treatment per se can also be conducted in multiple stages, if desired. The impregnated support, to facilitate handling, can thus be subjected to a first rather mild heat treatment to dry the support and thence, in a second step, to a more severe treatment to produce the desired chemical change at the surface. In the formation of such catalysts, supported catalysts such as supplied by commercial catalyst manufacturers, e.g., cobalt or nickel, alone or in combination with other metals such as iron, molybdenum, tungsten or the like, are also amenable to such treatments to transform them into highly active catalysts.

Suitable supports are the oxides of Groups II, III, IV, V and VI-B of the Periodic Chart of the Elements, though the oxides of Groups II, III-A and IV-B are preferred. Group III-A metal oxides, particularly alumina, are especially preferred. Alumina supports, in fact, are quite outstanding from a cost-effectiveness standpoint and are readily available. Silica-free alumina has been found especially suitable though silica-alumina is also highly active. Group II metal oxides, such as zinc oxide, magnesium oxide, calcium oxide, strontium oxide and barium oxide and also the Group IV metal oxides, e.g., titanium oxide and zirconium oxide, Group V metal oxides, e.g., vanadium oxide, and activated carbon and coke are effective. Certain natural clays, diatomaceous earths, e.g., kieselguhr, and other supports are also useful.

The impregnated, heat-treated catalyst is activated by treatment with an organometallic compound, suitably a hydrocarbon solution of an organometallic compound, a metallic constituent of which is selected from Group I, II and III, or more preferably from Group I-A, II-B, and III-A of atomic number ranging from 3 to 30, of the Periodic Chart of the Elements. Suitably, compounds include those having the formula: $R_nM$ wherein R is a monovalent organo or hydrocarbon radical, M is a Group I, II, or III, and preferably a Group I–A, II–B or III–A, metal having an atomic number of from 3 to 30, and $n$ is an integer ranging from 1 to 3, and equal to the valence of M. The R groups can be the same or different, substituted or unsubstituted, saturated or unsaturated, and can be alkyl, aryl, alkaryl, aralkyl, or cycloalkyl. Such groups include, for example, methyl, ethyl, n-propyl, isopropyl, isobutyl, sec-butyl, tert-butyl, n-amyl, isoamyl, heptyl, n-octyl, n-dodecyl, and the like; 2-butenyl, 2-methyl-2-butenyl and the like; cyclopentylmethyl, cyclohexylethyl, cyclohexylpropyl and the like; 2-phenylethyl, 2-phenylpropyl, 2-naphthylethyl, methylnaphthylethyl and the like; cyclopentyl, cyclohexyl, 2,2,1-bicycloheptyl and the like; methylcyclopentyl, dimethylcyclopentyl, ethylcyclopentyl, methylcyclohexyl, dimethylcyclohexyl, 5-cyclopentadienyl, and the like; phenylcyclopentyl, and the like; phenyl, tolyl, xylyl, ethylphenyl, xenyl, naphthyl, cyclohexylphenyl and the like. In general, any R group can contain up to about 20 carbon atoms. M is selected from such metals as lithium, magnesium, calcium, strontium, zinc, cadmium, boron and aluminum.

Preferred activating agents are the tri-alkyl substituted products of aluminum, particularly those containing alkyl groups having from 1 to about 12 carbon atoms, expecially linear alkyl groups. Exemplary of such compounds, which contain up to about 36 carbon atoms in the molecule, are trimethyl aluminum, triethyl aluminum, tri-n-butyl aluminum, tri-n-hexyl aluminum, tri-dodecyl aluminum and the like.

The activation can be carried out with pure or diluted metal alkyl compounds in liquid or in the vapor phase. Hydrocarbon diluents of the paraffinic, cycloparaffinic or aromatic types are entirely suitable and the metal alkyl compound may be present in concentrations of 5 percent to 50 percent in the diluent. A solution of about 20 percent aluminum triethyl in a paraffinic diluent is a preferred activation system. The activation reaction is quite exothermic and it may be desirable to remove the heat of activation. The temperature during the activation step is maintained in the range of from about 0° F. to about 500° F., preferably from about 100° F. to about 200° F. Considerable gas liberation occurs during activation and these gases are normally vented from the system. The activation is allowed to proceed until reaction is no longer observed, generally 0.5 hour to 2 hours in contact with at least some excess of metal alkyl compound.

After the activation step, the excess liquid can be drained from the catalyst, if desired. In any event, it is necessary to remove the unreacted organometallic activating agent, unbound by-products and volatiles from the catalyst. This can be done by any suitable method such as by washing, drying or the like, but preferably the activated catalyst is subjected to heat-treatment at temperatures sufficient to thoroughly dry and condition the catalyst. Preferably, the heat treatment is conducted in a nonreactive atmosphere at temperatures ranging from about 300° F. to about 1000° F., and more preferably from about 400° F. to about 500° F., for periods ranging from about 0.5 to about 4 hours, or more preferably from about 1 to about 2 hours. Complete or partial vacuum may also be used to aid in removal of excess solvent and organometallic alkyl compounds. The so-treated catalyst is then ready for use.

In conducting the reactions, a diluent is preferably employed, and any substantially inert medium can be used. When conducting reactions in liquid phase, one should be used which is liquid under the pressure-temperature relationship employed. Hydrocarbon solvents which are unreactive with the catalysts and liquid under most of the desired conditions of operation are, e.g., propane, butane, pentane, hexane, cyclohexane, octane, benzene, toluene, xylene and the like. In general, the paraffin solvents are preferred. In some instances, however, alcohols, ketones and the like can also be employed.

The mechanism of the reactions is not completely understood and, though applicants do not desire to be bound by a precise theory on mechanism, the activity of the catalysts are believed produced by an organo or hydrocarbyl radical attached to a metal or species of metal which is bonded to the support. Thus, in the initial impregnation and heat-treating steps the support behaves as a ligand, strong chemical bonding occurring between the surface and the species of metal, as can be represented by the following equation:

Surface: + $(H_2O)M$—X→Surface: MX + $H_2O$

In the equation the M—X represents the specific metallic salt introduced by the aqueous solution, MX represents a species of the reacted salt complexed with the support surface, and the colon indicates an electron donor site on the surface of the support.

In the activation step, the heat-treated supported catalyst is further treated or activated by an organometallic compound, especially on organo-aluminum or alkyl aluminum compound, to further chemically change the surface. It is theorized that the nonmetallic moiety of the applied salt is substituted by an organo, hydrocarbyl, or alkyl group, and that the ligand stabilized supported metal is alkylated by, e.g., an aluminum alkyl to give a stabilized alkyl derivative of the specific Group VIII metal.

The postulated or conceptualized mechanism of the dimerization or codimerization reaction is as represented below:

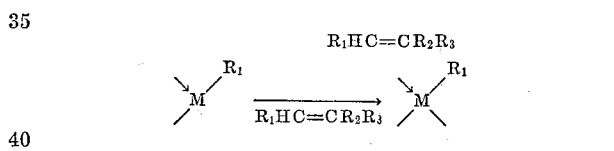

In the above set of reactions M represents a metal species bonded with an organo, hydrocarbyl or $R_1$ substituent, to a support surface (not shown). The arrow pointing to M represents a weak ligand bond from the support which can be replaced by a stronger π-electron bonding from the olefin. Upon initiation of the reaction by contact of the catalyst with an $R_1HC=CR_2R_3$ ethylenically unsaturated compound, π-bonding takes place between the metal species and a location of ethylenic unsaturation. For ease of illustration the $R_1$'s represent ethyl groups, that on the situs of the catalyst having been so produced by selective activation of the impregnated support with, e.g., triethyl aluminum. For convenience, the ethyl groups are hereafter represented by —C—C— and the $R_2R_3$ groups collectively as R', so that the strain from the π-bonding produces a metal hydride as by the following reaction, to yield R'C=C—C—C and a functional hydride group associated with the metal species:

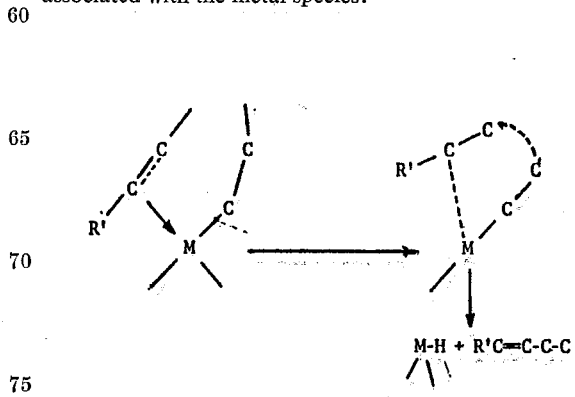

Additional C=CR' reacts with the hydride to yield the original complex.

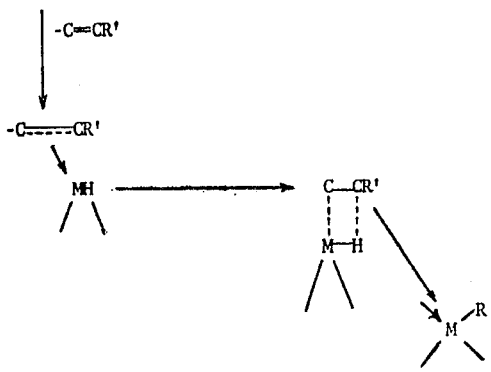

The invention will be better understood by reference to the following selected demonstrations and examples which bring out the more salient features of the invention.

Percentage figures for G.C. analysis are given in area percent, which closely coordinates with weight percent, unless otherwise specified.

EXAMPLE 1

Oligomerization of ethylene (activated nickel catalyst)

Catalyst preparation.—One hundred grams of F-1 alumina (Alco, 8–14 mesh) was impregnated with a solution prepared by dissolving 36 gms. $NiSO_4 \cdot 6H_2O$ in 64 gms. water. A small excess of solution was poured off and the impregnated base dried in the vacuum oven at 300° F. The recovered impregnated base weighed 114.9 grams, and analyzed 5.4 percent nickel (calculated as nickel).

The impregnated base was charged to a heated quartz tube and heated at 600° F. in a flow of dry nitrogen for two hours. After cooling to room temperature, the tube was flooded from the bottom with a 20 percent solution of aluminum triethyl in heptane. The maximum temperature reached 195° F. and considerable gas was evolved. After one hour the liquid was drained off and the activated catalyst was stripped with dry nitrogen to remove excess aluminum alkyl compounds.

Oligomerization: The so-prepared catalyst (62 gms.) and 300 cc. n-nonane were charged to a 1-liter Parr autoclave. The autoclave was pressured with pure ethylene to 300 p.s.i.g. and pressure was maintained at 300 p.s.i.g. as ethylene was consumed. Temperature was maintained at 75–85° F. Samples withdrawn periodically analyzed in a G.C. column as follows:

|  | Liquid sample analysis, percent | | | |
|---|---|---|---|---|
|  | $C_2^-$ | $C_4^-$ | $C_6^-$ | $C_8^-$ |
| Time on conditions, hrs.: |  |  |  |  |
| 0.5 | 0.4 | 5.1 | 2.2 | 0.7 |
| 1.5 | 0.3 | 10.4 | 4.3 | 2.0 |
| 2.5 | 0.4 | 14.0 | 5.4 | 2.5 |
| 3.5 | 0.4 | 13.9 | 7.2 | 3.7 |

Only trace amounts of materials heavier than $C_8$ were formed.

EXAMPLE 2

Oligomerization of propylene (activated nickel catalyst of Example 1)

Catalyst identical to that used in the foregoing was washed several times with n-dodecane and charged, along with 100 cc. of dodecane, to the Parr autoclave. Propylene (104 grams) was pressured into the autoclave. Temperature was maintained at 165–176° F. Pressure reached a maximum of 330 p.s.i.g. and dropped to 155 p.s.i.g. after 4 hours. Liquid samples withdrawn periodically analyzed as follows:

|  | Liquid product analyses, percent | | |
|---|---|---|---|
|  | $C_3^-$ | $C_6^-$ | $C_9^-$ |
| Time on conditions, hrs.: |  |  |  |
| 1.0 | 6.0 | 22.2 | 2.6 |
| 2.0 | 6.1 | 29.4 | 3.2 |
| 3.0 | 4.6 | 33.1 | 4.2 |
| 4.0 | 4.5 | 35.0 | 4.5 |

Only traces of products above $C_9$ olefin were detected; the remainder of the product was almost entirely n-dodecane.

In sharp contrast, when the foregoing run was repeated in precise detail except that the aluminum triethyl activation step was omitted from the procedure used in preparation of the catalyst, the conversion to polymerization products, based on the percent of propylene, was not more than 2%. This, as noted, profoundly differs from the conversion of about 45 percent obtained in the above example. Moreover, the percent selectivity to dimer in the reaction product mixture was found to be 90 percent (10 percent trimer) whereas the percent dimer found in the reaction product mixture of the run employing the unactivated catalyst was substantially nil.

EXAMPLE 3

Codimerization of propylene and n-butylene (activated nickel catalyst of Example 1)

Catalyst identical to that used in the foregoing was again washed with dodecane and charged to the autoclave with 100 gms. dodecane. Butene-1 (100 gms.) and propylene (47 gms.) were pressured into the autoclave. The mole ratio of butene-propylene was about 1.6. The reaction mixture was heated at 165–176° F.; pressure was initially 210 p.s.i.g. decreased to 155 p.s.i.g. after 4 hours. Liquid product samples withdrawn after 2 and 4 hours analyzed as follows:

|  | Liquid product analysis, percent | | | | |
|---|---|---|---|---|---|
|  | $C_3^- - C_4^-$ | $C_6^-$ | $C_7^-$ | $C_8^-$ | $C_9^-$ |
| Time on conditions, hrs.: |  |  |  |  |  |
| 2 | 25.2 | 6.5 | 5.4 | 2.7 | 0.5 |
| 4 | 28.1 | 8.9 | 6.5 | 3.4 | 0.6 |

*Largely $C_4^-$.

An analysis of the products is as tabulated below:

Catalyst: $NiSO_4$ F-1 alumina
$C_4/C_3$ mol ratio _____ 1.6/1
Temperature, ° F. _____ 165
Selectivity, percent:
  $C_6$ _____ 43
  $C_7$ _____ 36
  $C_8$ _____ 18
    Total ($C_6$–$C_8$)—(97%).
  $C_9$ _____ 3
  $C_{10}$–$C_{12}$ _____ <1

EXAMPLE 4

Example 2 was repeated except that a silica-alumina base was used in the formation of the catalyst. In the ensuing codimerization reaction, 40 percent conversion was obtained, based on propylene. Ninety-three percent selectivity to dimer was obtained, only about 7 percent of the reactants being converted to trimer.

EXAMPLE 5

The following demonstrates a simultaneous selective hydrogenation reaction and dimerization reaction.

A catalyst (53 grams) prepared and activated as in Example 1 was charged to the autoclave along with 100 cc. n-dodecane. Propylene containing 4.5 percent butadiene (102 grams) was pressured into the autoclave.

The reaction was carried out at 165–175° F. according to the following sequence:

After 1 hour there was no appreciable pressure drop and the concentration of dimer in the product was only 0.9 percent.

Approximately 2 molar equivalent of $H_2$ per mole of butadiene was added to the autoclave. After 1 hour additional, the dimer concentration was 3.5 percent and after a second hour was 5.8 percent.

Approximately 1 more equivalent of $H_2$/butadiene was added. After 1 hour longer, the dimer concentration had reached 9.3 percent.

EXAMPLE 6

A catalyst consisting of nickel and iron sulfates on alumina was prepared by impregnating 200 gms. of F–1 alumina with a solution prepared by dissolving 72 gms. $NiSO_4 \cdot 6H_2O$ and 76 gms. $FeSO_4 \cdot 7H_2O$ in 128 gms. water and heated slightly to aid solution. Recovered catalyst after drying in the vacuum oven was 262.7 gms.

The above catalyst (50 cc.) was charged to a quartz tube and heated at 810° F. in a stream of dry $N_2$ for 2 hours. After cooling to room temperature, the catalyst bed was flooded with a 20% solution of aluminum triethyl in n-heptane. The maximum transient temperature in the catalyst bed was 160° F. After one hour the solution was withdrawn and the catalyst stripped with dry $N_2$ for one hour at 375–415° F.

The activated catalyst (55.5 gms.) was charged with 100 cc. dodecane and 149 gms. butene-1 to a stirred autoclave and heated to 212° F. Samples were withdrawn at hourly intervals and analyzed by vapor chromatography. Results are compared with those from similar runs with catalysts consisting of $NiSO_4$ and $FeSO_4$ only on F–1 alumina:

| Dimer concentration, percent ($C_4$-free basis), at hour— | Catalyst | | |
|---|---|---|---|
| | $NiSO_4$ | $NiSO_4$, $FeSO_4$ | $FeSO_4$ |
| 1 | 33.6 | 44.9 | 1.6 |
| 2 | 40.3 | 48.0 | |
| 3 | 44.1 | 48.2 | 1.9 |

It is thus apparent that the presence of the iron produces a syngergistic effect.

EXAMPLES 7–8

The $NiSO_4$-$FeSO_4$ catalyst was evaluated with a synthetic feed consisting of 4.8% butadiene in butene-1 and approximately 2.5/1 mol ratio $H_2/C_4H_6$ with the following results in three consecutive runs on the same batch of catalyst. Reaction conditions were the same as for Example 6.

| | Example | | |
|---|---|---|---|
| | 6 | 7 | 8 |
| | Run | | |
| | 1 | 2 | 3 |
| | Feed | | |
| | Pure $C_4^=$–1 | 4.8% $C_4H_6$ in $C_4^=$–1 | Pure $C_4^=$–1 |
| | Mol ratio, $H_2/C_4H_6$ | | |
| Dimer concentration, percent ($C_4$-free basis) at hour | | 2.5 | |
| 1 | 44.9 | 27.4 | 31.5 |
| 2 | 48.0 | 32.2 | 35.5 |
| 3 | 48.2 | 34.8 | 36.0 |

Although there is some decrease in activity due to the poisoning effect of butadiene, the activity in the presence of hydrogen is better than 60 percent of that of a butadiene-free feed. In the absence of hydrogen, the catalyst is completely inactivated at this butadiene concentration.

EXAMPLE 9

F–1 alumina (400 gms.) was impregnated with a solution prepared by dissolving 130 gms. $NiCl_2 \cdot 6H_2O$ in 256 gms. $H_2O$. The vacuum dried catalyst weighed 457.9 gms. The catalyst was thermally treated, activated with aluminum triethyl and stripped as described in Example 6.

The autoclave was charged with 51.5 gms. of the above catalyst, 100 cc. dodecane and 106 gms. propylene. The dimerization was carried out at 165–170° F. with the following results:

| Concentration, percent ($C_3$-free basis) at hour | Dimer | Trimer |
|---|---|---|
| 1 | 26.3 | 4.5 |
| 2 | 32.1 | 4.4 |
| 3 | 33.8 | 5.6 |

EXAMPLE 10

The catalyst from Example 9 was rinsed with dodecane and recharged to the autoclave with 100 cc. dodecane and 75 gms. propylene. The pressure in the autoclave was 145 p.s.i.g. and was increased and stabilized at 400 p.s.i.g. with pure ethylene. The temperature was raised to 165° F. and the pressure had increased to 565 p.s.i.g. After one hour the pressure was 380 p.s.i.g., after two hours 300 p.s.i.g., and after three hours 245 p.s.i.g. After three hours a sample of the product was withdrawn and analyzed by vapor chromatography with the following results:

| Oligomer: | Concentration, percent ($C_2$-$C_3$ free basis) |
|---|---|
| $C_4$ | 24.2 |
| $C_5$ | 34.7 |
| $C_6$ | 21.7 |
| $C_7$ | 8.4 |
| $C_8$ | 6.2 |
| $C_9$ | 3.2 |
| $C_{10}$-$C_{11}$ | 1.6 |

The remaining product was hydrogenated with the same catalyst by increasing the pressure with hydrogen to 400 p.s.i.g. Hydrogenation was complete in less than one hour. The components were analyzed by vapor chromatography to determine the linear and branched paraffin concentrations with the following results:

| Fraction: | Linear | Branched |
|---|---|---|
| $C_4$ | 100 | 0 |
| $C_5$ | 80 | 20 |
| $C_6$ | 46 | 54 |
| $C_7$ | 32 | 68 |

EXAMPLE 11

A catalyst was prepared from nickel chloride and activated according to the procedure of Example 6.

This catalyst (55.6 gms.), 156 gms. butene-1, 62 gms. propylene, and 100 cc. dodecane were charged to the one-liter stirred autoclave. The mole ratio of butene/propylene was 1.9/1. The autoclave was heated and maintained at 165–170° F. for two hours. After two hours the pressure had decreased from an initial value of 160 p.s.i.g. to 80 p.s.i.g. The autoclave was pressured to 400 p.s.i.g. with hydrogen and repressured each time the pressure decayed to 300 p.s.i.g. Hydrogenation was complete in about 30 minutes.

The product was analyzed for molecular weight distribution and linearity in the principal carbon number with the following results:

$C_3$-$C_4$ FREE AND SOLVENT-FREE BASIS

| | Wt. percent | n-Paraffin, percent |
|---|---|---|
| Carbon Number: | | |
| $C_6$ | 21 | 32 |
| $C_7$ | 41 | 24 |
| $C_8$ | 20 | 18 |
| $C_9$-$C_{12}$ | 18 | |

EXAMPLE 12

The catalyst used in Example 11 was recovered, rinsed with hexene-1 and recharged to the autoclave with 250 ml. hexene-1. At 170° F. the conversion of hexene-1 to dimer was only 6% in 6 hours. Increasing the temperature to 300° F. for one hour brought the conversion to 23%. Selectivity to dimer was about 75%.

EXAMPLE 13

A catalyst prepared and activated as in Example 6 (50.8 gms.) was charged to the stirred autoclave with 100 cc. n-hexane. Butene-1 (100 gms.) and isobutylene (102 gms.) were pressured in. The temperature rose to 86° F. and was maintained in the range of 80-86° F. Samples withdrawn at hourly intervals were analyzed by vapor chromatography with the following results:

|  | 1 hour | 2 hours | 3 hours |
| --- | --- | --- | --- |
| Wt. percent: |  |  |  |
| n-Hexane | 75.4 | 65.5 | 62.3 |
| Diisobutylene | 12.3 | 17.5 | 19.3 |
| Codimer | 6.8 | 8.1 | 7.3 |
| Triisobutylene | 4.4 | 7.3 | 8.4 |
| Heavier product | 1.1 | 1.6 | 2.7 |

Based on the composition of the 3-hour reaction product, the selectivity to isobutylene oligomerization products was estimated to be 90%.

EXAMPLE 14

The catalyst used in Example 13 was rinsed with n-hexane and recharged to the autoclave with 100 cc. n-hexane. Isobutylene (207 gms.) was pressured in and the temperature maintained at 80° F. Samples were withdrawn and analyzed by vapor chromatography as follows:

|  | 1 hour | 3 hours |
| --- | --- | --- |
| Wt. percent: |  |  |
| n-Hexane | 82.0 | 61.8 |
| Diisobutylene | 11.6 | 24.3 |
| Triisobutylene | 5.2 | 11.4 |
| Heavier products | 1.2 | 2.5 |

The process of the present invention can be conducted in a batch, intermittent or continuous manner.

EXAMPLE 15

A catalyst was prepared by impregnating 200 gms. F-1 alumina with a solution prepared by dissolving 77 gms. $CoSO_4 \cdot 7H_2O$ in 128 gms. water. After drying in the vacuum oven the recovered catalyst weighed 241.6 gms.

The above catalyst (50 cc.) was charged to a heated quartz tube and heated at 810-850° F. for 2 hours in a flow of dry nitrogen. After cooling to room temperature, the catalyst bed was flooded with a 20% solution of aluminum triethyl in n-heptane. The temperature reached a maximum of 160° F. After one hour the liquid was drawn off and the catalyst stripped with dry nitrogen at 360-400° F. for about one hour.

The above activated catalyst (50.1 gms.) was charged with 100 cc. dodecane to a stirred autoclave. Propylene (105 gms.) was pressured into the autoclave and the contents heated to 165-175° F. The pressure was 345 p.s.i.g. when reaction temperature was reached; decayed to 225 p.s.i.g. in 3 hours. Samples withdrawn at hourly intervals were analyzed by vapor chromatography with the following results:

| Time on conditions, hrs. | Liquid product analyses, percent | | |
| --- | --- | --- | --- |
|  | $C_3^-$ | $C_6^-$ | $C_9^-$ |
| 1 | 4.4 | 12.3 | 1.6 |
| 2 | 5.1 | 13.8 | 2.1 |
| 3 | 4.8 | 16.6 | 2.8 |

The remainder of the product was dodecane.

It is apparent, in view of the foregoing disclosures, that various modifications, alterations and changes can be made without departing the spirit and scope of the present invention.

Having described the invention, what is claimed is:

1. A process for oligomerizing monoolefins, said process comprising the step of contacting a feedstream containing at least one ethylenically-unsaturated hydrocarbon, said hydrocarbon characterized by the formula:

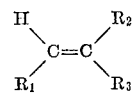

wherein $R_1$, $R_2$ and $R_3$ are selected from monovalent hydrocarbyl radicals, said radicals being one selected from the group consisting of hydrogen, alkyl, aryl, aralkyl, alkylaryl, and cycloalkyl, wherein the total molecule contains from 2 to 12 carbon atoms with a catalyst, said catalyst having been preformed by impregnating a silica-free alumina support with a metal salt, said salt being one selected from the group consisting of nickel chloride, nickel bromide, nickel fluoride, cobaltous chloride, cobaltous sulfate, and nickel sulfate, heat treating the supported water soluble metal salt at a temperature sufficient to remove water and adsorbed oxygen from said support and under conditions to prevent oxidation of the said metal salt, activating the supported metal salt with an organometallic compound $R_nM$, wherein M is a metal, said metal being one selected from the group consisting of lithium, magnesium, calcium, strontium, zinc, cadmium, boron and aluminum and R is a monovalent hydrocarbon radical containing from 1 to 20 carbon atoms and $n$ is an integer ranging from 1 to 3 equal to the valence of M, heat treating the catalyst in a non-reactive atmosphere at temperatures ranging from 300° F. to 1000° F. in order to remove any unreacted organo-metallic activating agent, unbound byproducts and volatiles from said catalyst, said contacting occurring under temperature and pressure conditions sufficient to maintain a liquid phase reaction.

2. A process according to claim 1 wherein ferrous sulfate is admixed with said metal salt prior to impregnating the said alumina support.

3. A process according to claim 1 wherein the feedstream contains propylene and n-butene in a $C_4/C_3$ mole ratio ranging from 1:1 to 5:1.

References Cited

UNITED STATES PATENTS

| 2,892,826 | 6/1959 | Peter et al. | 252—455X |
| 3,170,906 | 2/1965 | Ueda et al. | 252—429X |
| 3,255,273 | 6/1966 | Catterall | 260—683.15 |
| 3,354,235 | 11/1967 | Hogan et al. | 260—683.15 |
| 2,824,089 | 2/1958 | Peters et al. | 260—88.1 |
| 3,008,943 | 11/1961 | Guyer | 260—93.7 |
| 3,409,681 | 11/1968 | Kroll | 260—666 |
| 3,465,056 | 9/1969 | Hambling et al. | 260—683.15 |

PAUL M. COUGHLAN, Jr., Primary Examiner

U.S. Cl. X.R.

252—429, 430; 260—669, 680